United States Patent [19]

Scholl

[11] Patent Number: 4,560,984

[45] Date of Patent: Dec. 24, 1985

[54] METHOD AND APPARATUS FOR DETECTING THE COLLISION OF DATA PACKETS

[75] Inventor: Frederick W. Scholl, Riverdale, N.Y.

[73] Assignee: Codenoll Technology Corporation, Yonkers, N.Y.

[21] Appl. No.: 580,432

[22] Filed: Feb. 15, 1984

[51] Int. Cl.$^4$ ............................................ H04Q 00/00
[52] U.S. Cl. ............................ 340/825.5; 340/825.77; 375/113
[58] Field of Search ...................... 340/825.43, 825.77, 340/825.78, 825.5, 825.06; 350/96.16; 370/94, 85; 375/94, 95, 113

[56] References Cited

U.S. PATENT DOCUMENTS

| | | | |
|---|---|---|---|
| 2,651,677 | 9/1953 | Lair | 370/85 |
| 3,757,050 | 9/1973 | Mizote | 370/85 X |
| 4,161,786 | 7/1979 | Hopkins et al. | 370/94 X |
| 4,345,250 | 8/1982 | Jacobsthal | 340/825.5 |
| 4,390,990 | 6/1983 | Ainsworth | 340/825.5 X |

*Primary Examiner*—Ulysses Weldon
*Attorney, Agent, or Firm*—Pennie & Edmonds

[57] ABSTRACT

Method and apparatus for detecting when a collision occurs between two or more binary data signal packets at a single binary data signal receiver. Whenever a packet is transmitted, a large signal impulse is substituted for the initial bit of the packet. The amplitude of the impulse is such that it is significantly greater than the highest binary signal level transmitted. The receiver recognizes the impulse not as a data bit but as an indication of the beginning of a packet. Every packet has a known duration (or packet period) and is separated from the next packet by at least a known gap period. If two impulses are received within a period less than or equal to the sum of the packet and gap periods, a collision has occurred and a packet collision signal is generated.

9 Claims, 6 Drawing Figures

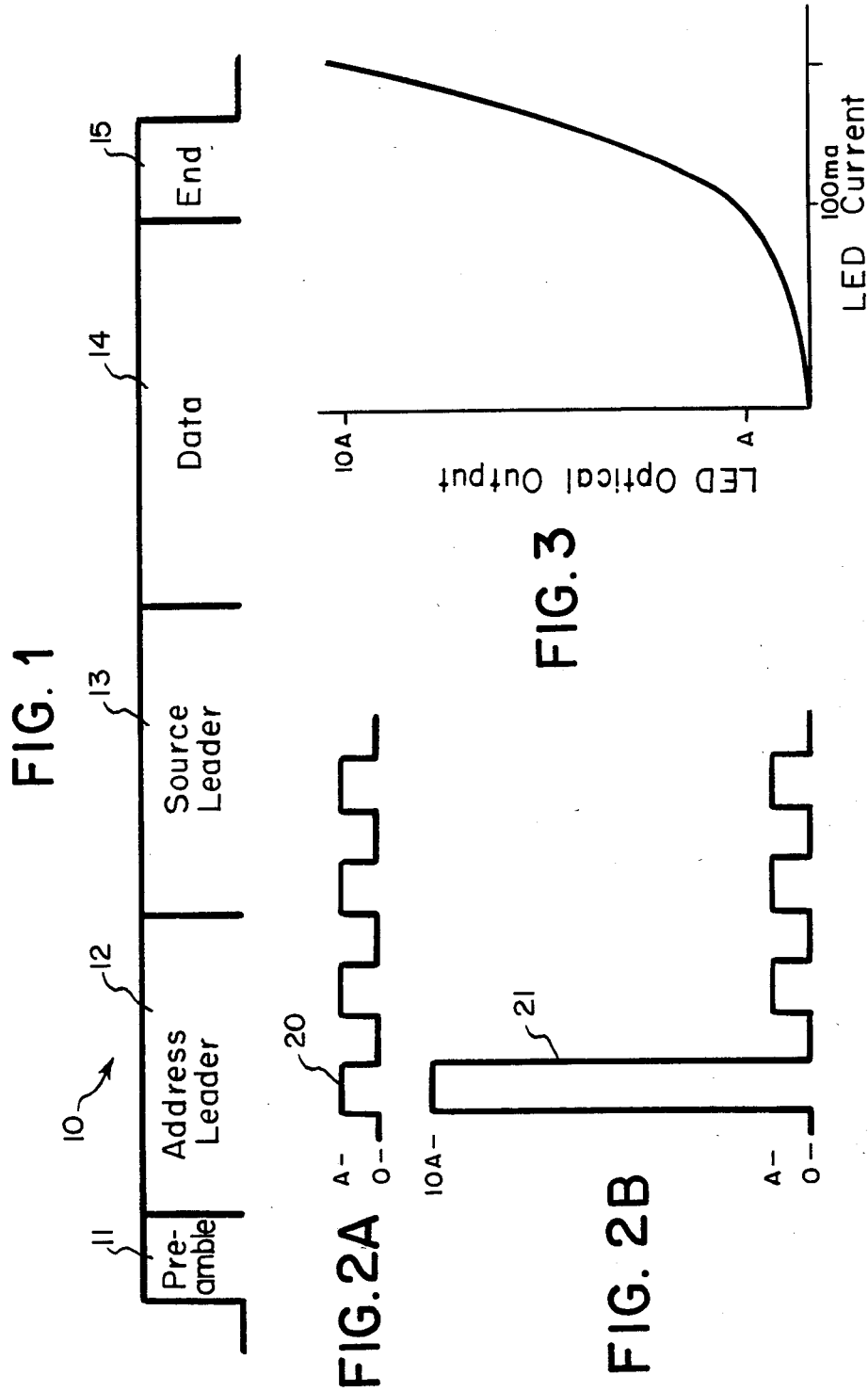

METHOD AND APPARATUS FOR DETECTING THE COLLISION OF DATA PACKETS

BACKGROUND OF THE INVENTION

The present invention relates to a method and apparatus for detecting when a collision occurs between two or more binary data signal packets when they are received by a single binary data signal receiver.

Computers are widely used for computation, data processing and in control and communication systems. Frequently, access to a computer is made by way of remote consoles or terminals each tying into the computer. The communications link between the terminals and the computer is advantageosly established by using optical fibers because of their known properties of high signal speed, structural simplicity, low distortion, and isolation from interference. They also compare favorably with coaxial cables and other metallic transmission lines because of their low attenuation and large bandwidth.

By taking advantage of the characteristics of computer communications, systems have been developed which allow many users to use a single computer at the same time. Computer communications are characteristically in the form of short bursts of binary information. Additionally, much of the time that a user is connected to a computer is actually idle time during which no information is being transmitted by either the computer or the user.

Two switching techniques are generally used in computer communication systems to permit non-exclusive use of a computer. These switching techniques are known as the circuit switching technique and the packet switching technique.

The circuit switching technique establishes a connection between a computer and a terminal only when data is to be transmitted. However, because the time required to establish a connection may be very large compared to the actual time of a communication, especially in the case of a short communication, this technique is slow, inefficient and expensive.

In contrast, the packet switching technique maintains the communications connection but transmits the data in the form of packets of binary information. Short communications are transmitted by a single packet while longer or bursty communications are transmitted by a series of packets. The packets are of a duration of about 60 microseconds, and if a communication cannot completely fit on to a single packet, more than one packet is transmitted separated by a gap of about 10 microseconds in duration.

The packets are divided into sections of bit cells each of which contains a bit of binary information. The packet is typically divided into two primary sections, the header and the data, each of which has a different purpose. The header is the portion of the packet which is initially received and contains such information as the address to which the packet is to be sent, the address of the sender of the packet and other information that the particular system requires. Following the header is the data section in which the substance of the communication is contained either wholly for a short communication, or partially for a longer communication. The packet may include an additional section which follows the data section which contains information relating to error checks or to packet linking.

Because packets arrive at the computer from separate terminals at random time intervals, it is possible that packet collisions will occur when more than one packet is received at the same time or when one packet arrives before another packet has been completely received. When a collision of packets is detected, an instruction is sent to retransmit the original data so that another attempt may be made to receive the packet without a collision. If a collision of packets is not detected, the information transmitted is lost since the signal received is unintelligible as it is a sum of the overlapping packets.

SUMMARY OF THE INVENTION

This invention relates to an improved method and apparatus for detecting when a collision occurs between two or more binary data signal packets.

In accordance with the invention, a large signal impulse is substituted for the initial bit of the packet whenever a packet is transmitted. The amplitude of the impulse is such that it is significantly greater than the highest binary signal level transmitted. The receiver recognizes the impulse not as a data bit but as an indication of the beginning of a packet.

For the Ethernet communications network, every packet has a packet period of a known time duration, $T_{Packet}$, and packets that are associated with a long communication are separated by gap periods of known duration, $T_{Gap}$. These two known periods of time are used to determine when a packet collision has occurred. If two large signal impulses are detected within a time period less than the sum of a packet period and a gap period ($T_{Packet}+T_{Gap}$), the collision detector will determine that a packet collision has occurred.

When an optical link is used to connect the transmitter and the receiver, the binary data signal is generated for transmission over the optical transmission medium by a light emitting device such as a laser or a light emitting diode. The large signal impulse at the beginning of every packet transmitted is produced by pulsing the light emitting device so that an optical pulse is produced with an optical intensity significantly greater than that associated with a high data bit. The amplitude of the optical impulse at the beginning of each packet is conspicuously greater than either binary data optical level, independent of the attenuation of the optical transmission medium, so that the beginning of receipt of a packet of data is always clearly indicated.

When a diode is used, an edge-emitting light emitting diode is preferred because the optical intensity produced does not saturate with increasing input current as is the case with a surface-emitting (or Burrus type) light emitting diode. Preferably, the edge-emitting light emitting diode is of a superradiant type for which the optical intensity increases superlinearly with input current.

BRIEF DESCRIPTION OF THE DRAWINGS

These and other objects, features, and advantages of the invention will be more readily apparent from the following description of a preferred embodiment of the invention in which:

FIG. 1 is a signal wave form envelope illustrating a packet of data.

FIGS. 2A and 2B are graphical representations of a portion of a data signal packet used in the invention.

FIG. 3 is a graphical representation of the optical output of a light emitting diode as a function of input current used in the invention.

DESCRIPTION OF THE PREFERRED EMBODIMENTS

Figure 4:
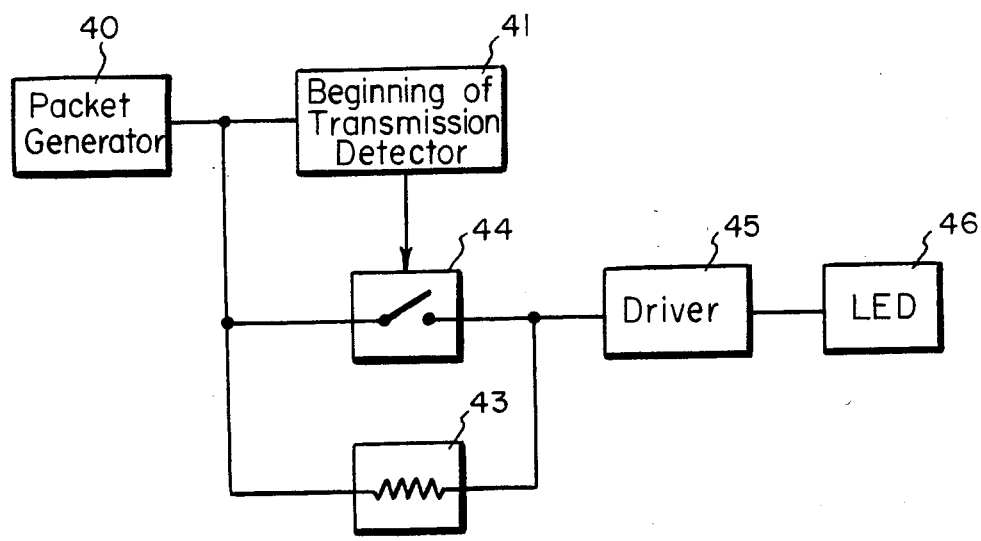
FIG. 4 is a block diagram showing a preferred embodiment of the transmitter used to generate the data signal packets of the invention.

In FIG. 1, a bit stream chart is shown illustrating a typical data packet used in the Ethernet communications network. The packet, generally designated 10, comprises a preamble 11, an address leader 12, a source leader 13, a data bit series 14 and an end section 15. Preamble 11, address leader 12 and source leader 13 are collectively known as a header. Packet 10 begins with preamble 11 which is generally in the form of a single synchronization or mark bit, or alternatively a string of bits. Preamble 11 is followed by a series of bits commonly known as an address leader 12 which designates the destination of the packet. After address leader 12 is a series of bits commonly known as a source leader 13 which designates the source of the packet. Data bit series 14 follows source leader 13 and contains the substance of the communication of packet 10. Data bit series 14 may be followed by end section 15 which includes various error checks or information on linking of the packet with a succeeding packet.

Typically, each bit of the packet is transmitted in the form of a bit cell which is a phase encoded version of the binary data bit. For example, in "Bi-Phase L" encoding, there is a signal transition once per bit cell and its direction is the value of the data bit. Typically, a low to high transition represents a high bit state (or 1) and a high to low transition represents a low bit state (or 0). When optical fibers are used as the communications link, a high signal corresponds to the presence of optical energy in the fiber while a low signal corresponds to the absence of optical energy. Midway between adjacent signal transitions, it may be necessary to have a set up transition so that the next data transition is in the correct direction. In particular, a set up transition is needed whenever it is necessary to generate two successive bits having the same binary state. Further details concerning such encoding are set forth in U.S. Pat. No. 4,282,512 which is incorporated herein by reference.

FIG. 2A is a graphical representation (not drawn to scale) of the initial bits of the portion of packet 10 comprising preamble 11 in a prior art Ethernet system. In the standard Ethernet system, the data rate is 10 megabits per second (Mbps) and each bit cell is 100 nsec. in duration.

In accordance with the invention, a large signal impulse is substituted for the initial bit of the packet whenever a packet is transmitted. The amplitude of the impulse is such that it is significantly greater than the highest binary signal level transmitted. The receiver recognizes the impulse not as a data bit but as an indication of the beginning of a packet.

FIG. 2B is a graphical representation (not drawn to scale) of the signal of FIG. 2A after a collision pulse 21 has been substituted for the initial bit of preamble 11 in accordance with the invention. The amplitude of pulse 21 is such that it is significantly larger than that of a high data bit. Illustratively, if the amplitude of a normal high data bit is equal to A, the amplitude of pulse 21 is equal to 10A.

Packets of binary information generally have a known duration, $T_{Packet}$, and are separated from adjacent packets of the same data communication by a known gap, $T_{Gap}$. When a first packet is separated from a second packet by a time period of at least the sum of packet period $T_{Packet}$ and gap period $T_{Gap}$, there is no packet collision. For the Ethernet communications network, $T_{Packet}$ is 57.6 $\mu$sec. and $T_{Gap}$ is 9.6 $\mu$sec. Thus $T_{Packet}+T_{Gap}$ is equal to 67.2 $\mu$sec.

If two large signal impulses are detected within a collision detection period less than the sum of a packet period and a gap period ($T_{Packet}+T_{Gap}$), a packet collision has occurred. When a collision of packets is detected by a collision detector, an instruction is sent by the collision detector to retransmit the original data packet so that another attempt may be made to transmit the packet without a collision.

Illustratively, the collision detector is a threshold detector which detects signals with an amplitude greater than the amplitude of a normal high data bit. When an impulse is detected, a clock is started. If another impulse is detected within the collision detection period a retransmit message is generated.

Although it is preferrable to use a collision detection period equal to the sum of a packet period and a gap period ($T_{Packet}+T_{Gap}$), other collision detection periods may be used. The collision detection period may be less than $T_{Packet}+T_{Gap}$ so long as it is greater than $T_{Packet}$. Alternatively the collison detection period may be greater than $T_{Packet}+T_{Gap}$.

When an optical link is used to connect the transmitter and the receiver, the binary data signal is generated for transmission over the optical transmission medium by a light emitting device such as a laser or a light emitting diode. The large signal impulse at the beginning of every packet transmitted is produced by pulsing the light emitting device so that an optical pulse is produced with an optical intensity significantly greater than that associated with a high data bit. The amplitude of the optical impulse at the beginning of each packet is conspicuously greater than either binary data optical level, independent of the attenuation of the optical transmission medium, so that the beginning of receipt of a packet of data is always clearly indicated.

FIG. 3 is a graphical representation of the optical intensity radiated by a preferred light emitting device as a function of the electrical current input. Typically during normal operation, the input of electrical current to the light emitting device varies between 0 and 100 ma. However, in order to produce the desired optical impulses with amplitudes of the order of ten times greater than a high data signal level, the light emitting device must be able to generate a continuous range of optical intensities for a wide range of input current values without reaching a saturation value. For this reason, edge-emitting light emitting diodes are used since the optical power radiated does not saturate for the range of input current values used in the invention as is the case with surface (or Burrus) type LED's.

A preferred type of LED is the superradiant edge-emitting LED in which the optical radiation increases superlinearly with input current. For this type of device a small change in input current will result in the desired large change in output optical radiation needed to produce the impulse signal used in the invention.

Figure 5:
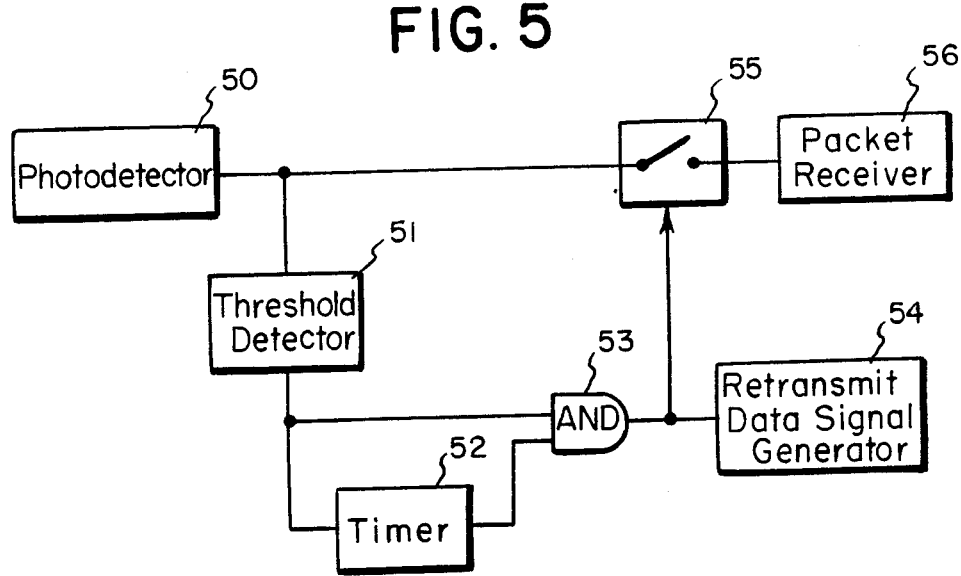
FIG. 5 is a block diagram showing a preferred embodiment of the receiver used to detect the collision of the data signal packets of the invention.

FIGS. 4 and 5 are block diagrams showing preferred embodiments of the transmitter and receiver used at one location to generate and detect the signal packet of FIG. 2B. The transmitter comprises a packet generator 40, a beginning of transmission detector 41, resistor 43, a switch 44, a driver 45, and a light emitting diode 46.

Packet generator 40 generates packets of binary data bits of duration equal to $T_{Packet}$ in the form shown in FIG. 2A. The packets are applied to beginning of transmission detector 41 which receives the packets and determines when the beginning of a packet has been received.

Switch 44 is a single pole single throw switch and is connected in parallel to resistor 43 between packet generator 40 and driver 45. While switch 44 is illustrated as an electromechanical device for convenience, a preferred embodiment of the switch is an electronic device. Switch 44 is normally open so that the output of packet generator passes through resistor 43 to driver 45. However, when beginning of transmission detector 41 detects the beginning of transmission of a packet from packet generator 40, the output of beginning of transmission detector 41 causes switch 44 to close for the duration of a bit allowing the output of packet generator 40 to bypass resistor 43 and pass directly to driver 45. As a result, a large amplitude collision detection pulse 21 such as that shown in FIG. 2B is generated at the output of LED 46.

Illustratively, if the amplitude of the collision detection pulse generated by packet generator 40 at the output of LED 46 is equal to 10A, the resistance of resistor 43 is chosen so that when the output of packet generator passes through resistor 43 the amplitude of the signal at the output of LED 46 is equal to about A.

As shown in FIG. 5, the receiver comprises a photodetector 50, a threshold detector 51, a timer 52, a logical AND gate 53, a retransmit data signal generator 54, a switch 55, and a packet receiver 56.

Photodetector 50 receives the output of an optical fiber (not shown) and converts the optical signal into an electrical signal. Threshold detector 51 receives tne output of photodetector 50 and determines if the output is greater than a threshold which is chosen so that the impulses generated by light emitting diode 46 of FIG. 4 of amplitude equal to 10A are detected. When the threshold of threshold detector 51 is exceeded, threshold detector 51 generates for a brief period of time a high (1) signal level that is applied to a first input of logical AND gate 53 as well as to timer 52. When the threshold of threshold detector 51 is not exceeded, however, the first input of logical AND gate 53 is at a low (0) signal level.

Additionally, whenever the threshold of threshold detector 51 is exceeded, the signal from detector 51 causes timer 52 to generate a high (1) signal that, regardless of the input signal, continues for a period of time equal to $T_{Packet}+T_{Gap}$ beginning immediately after the high signal from detector 51 terminates. The output of timer 52 is fed into the second input of logic AND gate 53. As a result, in the absence of a collision between two data packets no more than one input to AND gate 53 will be high at the same time and the output of AND gate 53 will accordingly be low.

Retransmit data signal generator 54 receives the output of AND gate 53. When a packet collision occurs, the output detector 51 will go high while the output of timer 52 is high and accordingly the output of AND gate 53 will go high. When the output of AND gate 53 goes high, retransmit data signal generator 54 generates a retransmit signal that is applied to the transmitter portion of the circuitry to cause it to retransmit the packet being sent. When the output of logic AND gate 53 is low (0), i.e., when no packet collisions have occurred, the retransmit signal generator is inactive.

Switch 55 is a single pole single throw switch and is closed when that output is low. Switch 55 opens only when the output of logic AND gate 53 is high (1), indicating that a packet collision has occurred. Packet receiver 56 is connected to the output of switch 55 and tnus receives the output of photodetector 50 only when no packet collisions have occurred.

While the invention has been described in conjunction with specific embodiments, it is evident that there are numerous specific circuits which may be used which will be apparent to whose skilled in the art in light of the foregoing description.

What is claimed is:

1. A method for detecting collisions of packets of binary data comprising:
   generating in each binary data signal packet a collision signal having an amplitude that is significantly greater than that of a high binary data signal level;
   receiving said data signal packet; and
   producing a packet collision signal whenever two of said collision signals are received within a detection period equal to the sum of the duration of a packet and the minimum length of time between packets.

2. The method of claim 1 wherein said collision signal generated has an amplitude at least ten times greater than that of a high data signal level.

3. An apparatus for detecting collisions of packet of binary data comprising:
   means for generating in binary data signal packets a collision signal having an amplitude significantly greater than that of a high binary data signal level;
   means for transmitting said data signal packets having said collision signal;
   means for receiving said data signal packets from said transmitting means; and
   means for producing a packet collision signal whenever two collision signals are received by said signal packet receiving means within a detection period equal to the sum of the duration of a packet and the minimum length of time between packets.

4. The apparatus of claim 3 wherein the generating means generates said collision signal with an amplitude at least ten times greater than that of the high data signal level.

5. The apparatus of claim 3 wherein:
   said transmitting means comprises an optical signal transmitting means connected to said generating means which converts said output of said generating means into a modulated optical signal and transmits said modulated optical signal over an optical transmission medium; and
   said receiving means comprises an optical receiving means which receives said modulated optical signal from said optical transmission medium and converts said modulated optical signal into a modulated electrical signal that is applied to said means for receiving said data signal packets.

6. The apparatus of claim 5 wherein the optical signal tfansmitting means is an edge-emitting light emitting diode, the optical output of which varies superlinearly with input electrical current.

7. In an apparatus for the transmission and receipt of packets of binary data, a transmitter comprising:

a packet generator which generates packets of binary data;

a beginning of transmission detector which receives an output of said packet generator and identifies the beginning of a packet;

an optical source for transmitting said packets over an optical transmission medium; and a first switch connected to an input of said optical source and controlled by said beginning of transmission detector so that when said beginning of transmission detector identifies the beginning of a packet a signal having a first amplitude is applied to said optical source and at all other times during transmission of said packet signals applied to said optical source have an amplitude significantly lower than said first amplitude.

8. In combination with the apparatus of claim 7, a receiver comprising:

a threshold detector which receives said signal transmitted by said transmitter, said threshold detector generating a first signal only when a predetermined threshold value is exceeded and a second signal at all other times;

a timer which receives the output of said threshold detector and generates a third signal for a predetermined length of time after said threshold detector generates a first signal;

logic means for producing a fourth signal only upon coincidence of said first and third signals, said fourth signal causing said transmitter to retransmit said signal; and a signal receiver which receives the signal transmitted by said transmitter if there is no fourth signal.

9. The apparatus of claim 8 wherein said optical source is an edge-emitting light emitting diode, the electrical output of which varies superlinearly with input electrical current.

* * * * *